UNITED STATES PATENT OFFICE 2,442,535

MODIFICATION OF GLYCERIDES

Eddy W. Eckey, Wyoming, Ohio, assignor to The Procter & Gamble Company, Cincinnati, Ohio, a corporation of Ohio No Drawing. Application March 26, 1946, Serial No. 657,341

14 Claims. (Cl. 260—410.7)

The present invention relates to interesterification in glycerides, that is, the rearrangement of fatty acid radicals in glycerides, and particularly to a process whereby interesterification in fats may be controlled to yield products of a desired constitution.

In my application Serial No. 562,062, filed November 6, 1944, there is disclosed and claimed a process of interesterification (synonymously referred to therein as molecular rearrangement) based on the discovery that under the proper conditions of treatment the rearrangement of fatty acid radicals in fats may be directed and controlled to achieve results not previously known to be obtainable. As disclosed therein, if a triglyceride fat is mixed with a suitable catalyst and interesterification is conducted at a temperature below that at which the liquid phase is saturated with respect to relatively high melting triglycerides, such high melting triglycerides formed in the course of interchange of fatty acid radicals will crystallize from the liquid fat and will thereby withdraw progressively from the phase in which rapid interchange takes place. Thus as molecules having low solubility in the liquid fat phase are formed and crystallize out of solution, further participation of such molecules (such as would occur in the conventional liquid phase interesterification) is prevented or materially retarded. Consequently, in the whole fat mixture, the percentage of high melting triglycerides of low solubility tends to increase as long as crystallization continues. Crystallization of such relatively insoluble triglycerides can continue as long as the quantity newly formed in the interchange reaction exceeds the quantity that can remain dissolved in the liquid fat phase at the temperature of reaction.

The type of triglyceride that is least soluble in the liquid fat phase and that ordinarily predominates in the crystalline phase formed when the process is applied to a fat of average composition is the high melting type of glyceride in which all three fatty acid radicals are saturated and have relatively long carbon chains of approximately the same length. Accordingly, unless special precautions or modifications of conducting the process are followed, such as preferential seeding or the use of special temperature control, to induce the crystallization of a different type of triglyceride, practice of the process on a fat of average composition will involve the crystallization mainly of such high melting triglycerides, and will effect in the fat as a whole the conversion of a large proportion of the mixed saturated-unsaturated triglycerides of the fat into completely saturated triglycerides and completely unsaturated triglycerides. The utility of such conversion is illustrated in the description and examples of application Serial No. 562,062.

In the present application, which relates to the same general subject matter insofar as interesterification with simultaneous crystallization is concerned, it is my object to provide an improved method for directing the interesterification reaction so as to preferentially form triglycerides of intermediate melting characteristics, to extend thereby the range of glyceride compositions obtainable in applying the process of interesterification with simultaneous crystallization of insoluble triglycerides to any given fat, fatty oil, or fat mixture (herein collectively referred to as "fats"), to provide means for narrowing the melting point range of fats, and to provide means for effecting desirable modifications in fats to suit requirements of various uses such as the production of margarine and confectioners' hard butter.

In particular the invention contemplates the steps of beginning the interesterification reaction in the presence of glyceride crystals consisting predominantly of mixed triglycerides, that is, triglycerides constituted of more than one kind of combined fatty acid, and thereafter controlling the temperature of the reaction within a range of which the lower limit is the lowest temperature at which a portion of the triglyceride is liquid and the upper limit is the highest temperature at which mixed triglycerides can crystallize from the liquid phase as the same are formed in interesterification. Apparently there is a tendency for the glycerides crystallized during interesterification to have the character of the seed crystals present at the beginning of the interesterification, provided that other conditions are favorable for the continued formation and crystallization of such glycerides.

As indicated above, the present process permits the preferential crystallization during interesterification of solid glycerides which have lower melting points than those glycerides that would crystallize without such control. Thus, for example, the invention provides a process for the production of fats which possess desired firmness at certain temperatures important in their utilization without unduly raising the final melting point of the fat. More specifically, the process may be controlled to produce a crystallized phase which consists predominantly of mixed saturated-unsaturated glycerides, or mixed glycerides in which the fatty acids are saturated but differ in carbon chain length, or mixtures of such glycerides with simple saturated glycerides.

In the application of the present process, the conditions of processing are chosen and controlled in relation to the character of the fat being processed to yield results which are significantly different both from those of the ordinary liquid phase interesterification and those of the typical examples of Serial No. 562,062. It is possible, for example, to increase greatly the proportion of disaturated-monounsaturated glycerides without increasing substantially the proportion of fully saturated glycerides.

If, for example, a fat such as cottonseed oil, soybean oil, corn oil, or the like is cooled before interesterification so as to effect formation of a substantial proportion of fat crystals prior to contact with the catalyst, these fat crystals will consist mainly of mixed triglycerides such as disaturated-monounsaturated triglycerides and will promote the crystallization of such triglycerides as the same are formed on interesterification after contact with the catalyst is established, provided other conditions are such as to favor the formation and crystallization of such triglycerides. Thus the formation of solid high melting trisaturated glycerides can be depressed while a sharp increase in the intermediate melting disaturated-monounsaturated glyceride content is effected. The physical characteristics of the fat are modified accordingly.

The procedure which has been used to advantage in determining relative proportions of high melting, intermediate melting, and low melting triglycerides in a triglyceride mixture, such as cottonseed oil, soybean oil and the like, involves dissolving 100 grams of the triglyceride mixture in 400 ml. of a solvent mixture consisting of 93 parts by volume of acetone and 7 parts by volume of ethanol, allowing the high melting fraction to crystallize at 70° F., then filtering off the solids and washing with about 100 ml. of solvent at 70° F. The combined filtrate and washings are then cooled to 32° F. to crystallize an intermediate melting fraction consisting in a large part of mixed triglycerides such as disaturated-monounsaturated triglycerides. The first separation at 70° F. gives an indication of the content of high melting completely saturated triglycerides and is comparable to a determination made by crystallization of the fat from 10 volumes of petroleum ether at 40° F.

The following examples and accompanying details will illustrate the manner in which the invention may be practiced, but it is to be understood that this exemplary matter is given by way of description only and is not to be construed as limiting the scope of the invention covered by the appended claims.

*Example 1.*—300 parts refined, bleached and dried cottonseed oil having an iodine value of 112.9 were placed in a closed container and cooled to 40° F. and held at this temperature for about 5 days, which was longer than necessary to develop crystallized triglycerides in the oil. The mixture of solid and liquid triglycerides was then mixed thoroughly with 0.6% of sodium methoxide in the form of a suspension in xylene and rearrangement was allowed to take place at about 40° F. for 3 days, the mixture of glycerides and catalyst being gently agitated throughout this period. The catalyst was then inactivated by the addition of glacial acetic acid, after which the interesterified fat was melted, washed, and dried. The interesterified oil was then dissolved in the acetone-ethanol solvent and subjected to fractional crystallization as above described. The high melting fraction separated at 70° F. amounted to 0.9% of the interesterified oil and had a complete melting point of 138.3° F. and the intermediate fraction separated at 32° F. amounted to 20.3%, and had an iodine value of 58.9 and a complete melting point of 109.9° F.

*Example 2.*—Refined, filtered, and dried cottonseed oil having an iodine value of 107.5 was placed in a closed container and cooled to 40° F. and held at this temperature for 2 days. At the end of the two-day period, the oil contained a considerable quantity of a solid phase. To the oil in this condition was added sodium tertiary butoxide (in quantity molecularly equivalent to 0.2% sodium methoxide) in the form of a suspension in xylene. After thorough mixing of the contents the containers were allowed to stand for 5 days at 40° F. The catalyst was then inactivated by the addition of an equivalent quantity of glacial acetic acid, after which the fat was melted, washed, and dried.

In the following table are given the results of the above procedure in direct comparison with results obtained in effecting interesterification on the same oil at 120° F. (wholly in the liquid phase) to obtain a distribution of fatty acid radicals in accordance with the mathematical laws of probability.

| Sample | Cloud Point, °F. | Capillary Melting Point, °F. | Fractional crystallization at 70° F. from acetone-ethanol solvent mixture, Per Cent Solid Fraction | Fractional crystallization at 32° F. after removal of solid fraction obtained at 70° F. | |
|---|---|---|---|---|---|
| | | | | Per Cent Solid Fraction | Melting Point of Solid Fraction, °F. |
| Original oil | 28 | About 60 | None | 6 | 106 |
| Oil rearranged at 120° F | 51 | 95 | Trace | 7 | 128 |
| Oil rearranged in accordance with this example | 51 | 99 | None | 25.9 | 112 |

*Example 3.*—In order to show in detail the marked difference in results obtained by conducting the interesterification in accordance with a practice of the present invention and in accordance with a practice involving first mixing in the catalyst with the fat, then gradually cooling during interesterification, the following direct comparison was made.

Refined, filtered, and dried cottonseed oil having an iodine value of 110.6 was chilled to 40° F. and held at that temperature for one day during which time a considerable quantity of solid triglycerides formed. Thereafter 0.2% of sodium methoxide in the form of a suspension in xylene was added and thoroughly mixed into the mixture of solid and liquid triglycerides. The mixture was then held 5 days at 40° F.

In the companion interesterification the same proportion of the methoxide catalyst was mixed with the same oil at 120° F., following which the mixture was held at 70° F. for one day, 60° F. for one day, 50° F. for one day, and 40° F. for 5 days.

The results of fractional crystallization from the acetone-ethanol solvent are given in the following table.

| Sample | Cloud Point, °F. | Melting Point, °F. | High melting fraction crystallized at 70° F. from acetone-ethanol solvent | | Intermediate melting fraction crystallized from acetone-ethanol solvent solution at 32° F. after removal of solid fraction at 70° F. | |
|---|---|---|---|---|---|---|
| | | | Per Cent | M. P., °F. | Per Cent | M. P., °F. |
| Original oil | 26.6 | | 0 | | 1.3 | 120.7 |
| Oil chilled to 40° F. and rearranged at 40° F. | 64.6 | 103.1 | 2.4 | 135.3 | 20.3 | 114.3 |
| Oil mixed with catalyst then gradually cooled to 40° F. | 82.9 | 120.0 | 12.9 | 139.5 | 3.5 | 130.1 |

It is apparent that the process of the present invention as illustrated in Example 3 directed the interesterification reaction toward the formation of the intermediate melting triglyceride.

The above examples illustrate a preferred manner of practicing the invention wherein the presence of the mixed triglyceride crystals in the glyceride is established by fractional crystallization of the glyceride before the addition of the catalyst. A practical way of conducting such a process involves passage of liquid fat through a rapid chilling device such as a Votator. The chilled fat containing the crystallized mixed triglycerides is then conducted to reaction vessels located in rooms which are suitably controlled as to temperature. The low temperature interesterification catalyst is then added and the reaction is permitted to take place for the desired length of time.

Instead of effecting seeding of the fat before the addition of the catalyst by chilling the entire batch of fat as suggested above, it is also possible to add a slurry of the desired crystallized triglyceride in liquid fat at a suitable temperature, and in many instances such a procedure may prove to be more convenient. One method which is practical involves chilling a portion of the fat to be subjected to interesterification, such as one half to three quarters, to a temperature below its cloud point in a Votator and then mixing the chilled fat containing mixed triglyceride crystals in a picker box or similar mixing device with the remainder of the fat which is at such a temperature that the mixture will be brought to the desired temperature for the interesterification process. The catalyst is then added and interesterification is permitted to take place.

Since natural fats, hydrogenated or unhydrogenated, are generally constituted of triglycerides which have more than one kind of fatty acid combined to a glycerin radical, chilling the fat before the addition of the catalyst to induce crystallization results in the formation of crystals of mixed triglycerides which serve the seeding purposes in the practice of the present invention.

Although adding the catalyst to the glyceride mixture containing crystals of the mixed triglyceride is a preferred procedure, it is also possible to add the catalyst to the liquid fat and then chill the mixture promptly before appreciable interesterification can take place, so that mixed triglycerides which precipitate on chilling are present at the beginning of the interesterification reaction. In this procedure also, the Votator may be advantageously employed.

When it is more desirable to add mixed triglyceride crystals to the glyceride undergoing interesterification rather than develop the crystals by chilling such glyceride, then the crystallized mixed triglycerides may be added before or after, or simultaneously, with the addition of the catalyst and rearrangement conducted at a suitable temperature, but as pointed out above it is preferable to add the catalyst and thereafter operate under conditions such that the mixed triglyceride crystals are present at the beginning of the interesterification to influence the course of the reaction, thus effecting maximum conversion of the glyceride during interesterification to mixed triglycerides.

The invention is not limited in its application to oils such as cottonseed oil shown in Examples 1, 2, and 3, but may be practiced on other fats such as tallow, palm oil, coconut oil, menhaden oil, whale oil and their hydrogenated and partially hydrogenated derivatives. Thus the invention may be applied to all natural vegetable, animal and marine oils as well as synthetic glycerides constituted of combined fatty acids which differ in respects affecting solubility of glycerides thereof in the glyceride system.

The net result of practicing the present invention on the various fats specifically mentioned and on other triglyceride mixtures is in general an increase in the intermediate melting triglyceride fraction as distinguished from the increase in high melting fraction noted when the catalyst is added to the liquid triglyceride mixture and the temperature gradually reduced during interesterification. Thus practice of the invention on partially hydrogenated soybean oil or partially hydrogenated cottonseed oil and other triglyceride mixtures containing relatively high proportions of combined saturated fatty acids modifies the characteristics of the fat markedly over that which would result either from interesterification wholly in the liquid phase or from low temperature interesterification wherein the temperature is higher at the start and is gradually reduced during the reaction. In the latter instance the product of the interesterification is composed essentially of a mixture of triglycerides of only high melting fatty acids and triglycerides of only low melting fatty acids and therefore is characterized by a large difference between the incipient and complete melting points of the fat. Such fats are well adapted for the preparation of shortenings which show relatively little change with change in temperature over a wide range of room temperature.

On the other hand, the same fat, treated in accordance with the instant invention, may be modified to melt at a lower maximum temperature, to change from solid to liquid and vice versa over a narrow range of temperature, and to serve excellently for a number of uses such as a base stock for margarine production.

*Example 4.*—Filtered and dried hydrogenated soybean oil having an iodine value of 79.6, a congeal of 22.2° C. and a complete capillary melting point of 32.2° C., and containing by analysis 15.5% combined saturated fatty acid, 53.8% combined oleic acid, 22.7% combined isooleic acid, and 8% combined linoleic acid was chilled to 60° F. to develop a heavy precipitate of solid triglycerides. To the mixture of liquid and solid triglycerides was added a quantity of sodium methoxide catalyst in the form of a suspension in xylene equal to 0.3% by weight of the hydrogenated oil. The oil was blanketed with nitrogen and constantly agitated while interesterification was permitted to take place for 48 hours at 60° F. At the end of the interesterification reaction, the catalyst was inactivated with an equivalent quantity of glacial acetic acid without substantial change in temperature.

The product of the above interesterification was refined, bleached, and deodorized, then converted into a margarine as follows. To 1000 parts of the interesterified oil was added 7.3 parts of substantially completely hydrogenated cottonseed oil which had been reacted with glycerin to bring the combined glycerin content up to 13.8%. Then 2.7 parts of soybean oil phosphatides were added. This mixture was emulsified with 150 parts buttermilk by mechanical agitation, and then chilled to about 50° F. on a refrigerated drum. The chilled mixture was then blended with 100 parts of buttermilk and 40 parts of salt in a mechanical blender, then molded and compared with available commercial products.

The product of the present invention was less firm than the commercial products at icebox temperature (50° F.) and therefore had better spreading characteristics at the lower temperatures. It was also easier to incorporate the coloring matter in the product of the present invention, but in spite of such softer characteristics at the lower temperatures the product was substantially as firm as the commercial margarines at higher room temperatures (80° F.). These improved characteristics are realized without raising the complete melting point above that desirable in a margarine fat having good eating qualities.

The invention also finds application in the manufacture of sharp melting fats such as the confectioners' hard fats customarily employed in the preparation of chocolate coatings, candy fillings, cake icings, and products of similar nature. For example, a satisfactory confectioners' hard fat may be prepared from coconut oil by first hydrogenating to an iodine value of about 1.5, then chilling to a temperature of about 70–80° F. to induce crystallization of mixed saturated triglycerides, and then mixing the mixture of solid and liquid triglycerides with a low temperature interesterification catalyst and permitting the interesterification reaction to take place at the temperature of chilling. The resulting product, after inactivation of the catalyst with glacial acetic acid, purification by alkali refining and deodorization, is a sharp melting fat, is brittle up to 80° F., is not waxy at body temperature but stands up satisfactorily at about 90° F. and may be used directly without fractional crystallization as a confectioners' hard fat in the preparation of chocolate coatings, candy fillings, icings, and the like.

As above indicated, practice of the invention on hydrogenated coconut oil, which may contain a considerable proportion of high melting trisaturated glycerides, effects the preferential formation of intermediate melting mixed saturated triglycerides and thereby overcomes the undesirable waxy characteristics ordinarily observed in confectioners' hard butters containing high melting trisaturated glycerides which may result either from hydrogenation of the oil or by the addition of substantially completely hydrogenated fats.

Similar improvement may be obtained in the practice of the invention on hydrogenated or partially hydrogenated oils of the coconut group other than coconut oil, such as tucum nut oil, palm kernel oil, babassu oil, and the like.

The temperature to be employed for the simultaneous interesterification and crystallization will vary with the characteristics and composition of the oil being rearranged, and particularly will vary with the relative solubility of mixed triglycerides in the system. Thus, for example, interesterification of cottonseed oil, sesame oil, sunflower seed oil, rapeseed oil, corn oil, and other oils having iodine values from 100 to 130 should be 40° F. or lower in order that appreciable formation of the mixed triglycerides of intermediate melting characteristics formed in the interesterification reaction may be preferentially precipitated. Temperatures as low as 32° F. have been successfully employed.

In the case of those fats which contain a greater proportion of combined fatty acids of high melting nature, such as the partially hydrogenated derivatives of cottonseed oil and soybean oil having iodine values from about 60 to 90, a suitable temperature at which to subject the said mixture to interesterification is 60° F. or lower. Similarly, higher temperature may be employed in the case of higher melting fats such as tallow, palm oil, coconut oil and the like.

In some cases, especially where separation of solid and liquid fractions is desired or when higher melting fats are being processed, it may prove advantageous to conduct the interesterification in the presence of an inert solvent such as hexane, pentane, ethyl ether, benzene, carbon tetrachloride, Skellysolve solvents, pyridine and the like.

In the examples I have shown the use of sodium methoxide and sodium tertiary butoxide as catalysts for the interesterification reaction, but successful practice of the invention does not depend upon the use of these particular compounds. Any material which will promote interesterification at the low temperatures required for crystallization of the solid mixed triglyceride fraction is suitable for use.

It is not unlikely that the true catalyst for the interesterification reaction is not the alkoxide or other compound added to the glyceride mixture but rather a compound resulting from the reaction of such added compound with the glyceride.

The formation of active catalyst in the glyceride mixture can take place either by direct reaction of an alkali metal such as sodium or potassium with mono-, di- or triglycerides, sterols contained in the fat, or by the reaction of one or more of a great number of compounds which are capable of forming alkoxides by reaction with alcoholic substances. Such compounds will form alkoxides and will react with fats to form active catalyst as does sodium methoxide when the material with which the metal or other cation is combined is not so acidic as to hold the cation in combination and prevent reaction with glyceride.

Thus, for example, potassium or sodium in combination with practically any material less acidic than phenol can form the catalyst when added to the glyceride. Sodium phenoxide appears to be on the borderline between what may be referred to in the present sense as active and inactive materials because only slight activity of this material in low temperature interesterification is noted when liberal quantities are added to the glyceride mixture. Compounds of sodium with materials more acidic than phenol (with fatty acids for example in the form of soap) will not react with the fat to form an active catalyst at the temperatures required in the practice of this invention.

In the above examples I have chosen to illustrate the process principally with the use of an alkoxide compound such as sodium methoxide. This specific compound is a practical material for use in promoting the interesterification in accordance with the invention because of the ready occurrence of the raw materials and its ease of preparation, and therefore the major portion of the work on interesterification processes involving application of the principles set forth herein has included the use of sodium methoxide. The methoxides of other alkali metals such as lithium, and especially potassium, are also active in forming catalytic materials with the fat. The methoxides of alkaline earth metals such as calcium also have been found to possess some activity in the range of temperatures required for the reaction, but liberal quantities are preferably employed in this instance because of lower activity. Methoxides, in which the cation is the tetrasubstituted ammonium radical, such as tetramethyl ammonium methoxide and lauryl benzyl dimethyl ammonium methoxide also show activity in the reaction of the present invention.

In addition to the methoxides, the corresponding ethoxides, propoxides, butoxides and alkoxides made from alcoholic compounds in general such as lauryl alcohol, ethylene glycol, mono- and diglycerides of the glyceride mixture, and others may be employed. Molecularly equivalent proportions of such alkoxides appear to be substantially equivalent in activity.

Moreover, the addition of alkali-metal-organic compounds containing the alkali metal atom directly bound to a carbon atom as in triphenylmethyl sodium or to a nitrogen atom as in potassium pyrrole will result in the promotion of interesterification as conducted by the present process. The addition of a suspension of finely divided metallic potassium hydroxide in a hydrocarbon solvent consisting essentially of undecane has also resulted in the promotion of the interesterification reaction at low temperature.

Because of the great variety of materials that may be used to form the active catalyst and because the actual structure of the catalytic materials formed is as yet not accurately known, the catalytic materials are generically referred to in the claims as low temperature molecular rearrangement catalysts.

The addition of the catalytic material to the glyceride mixture is preferably conducted in such a way that uniform distribution throughout the glyceride mixture in a finely dispersed phase results. The examples above show the use of a fine dispersion of sodium methoxide or sodium butoxide in xylene. A solution of sodium methoxide in anhydrous methanol or of sodium ethoxide in ethanol may also be used. It may be especially convenient to store the catalyst in the form of a dispersion in an inert solvent other than xylene, such as toluene, petroleum naphtha and the like, and in such form the catalyst may be dispersed readily in the glyceride mixtures. The dispersion may be prepared by the reaction of sodium and alcoholic substance in stoichiometric amounts in the solvent itself prior to the addition thereof to the glyceride mixture. In the case of catalytic materials that can be prepared in powdered form, such as powdered sodium methoxide, the powdered material may be mixed with the fat without the use of a carrier.

When the highly reactive catalytic materials referred to herein are employed to promote the interesterification reaction in the practice of the process, it is desirable that the glyceride mixture be essentially free from moisture, oxygen, fatty acids, carbon dioxide, peroxides, and the like so as to avoid decomposition of the catalytic material to such an extent as would reduce the content of same to an ineffective amount.

The low temperature interesterification catalysts employed in carrying out my invention are highly efficient in effecting the regrouping of fatty acid radicals, and for this reason it is preferable to render the catalysts inactive after the desired arrangement has taken place and before the temperature of the fat is allowed to rise appreciably so that substantially no modification results during handling of the fat. For example, mere heating of the rearranged fat in the presence of the active catalyst to a temperature at which the crystallized portion becomes liquid will permit an undesirable reverse rearrangement in which the desired mixed triglyceride content decreases in a distribution tending toward the random arrangement obtained in the ordinary molecular interchange reactions conducted wholly in the liquid phase. Thus in order to retain the degree and kind of interesterification effected at low temperature, it is preferable to treat the mixture containing the catalyst with an inactivating material, for example, an acid reacting compound such as hydrochloric acid, phosphoric acid, carbonic acid, glacial acetic acid, higher fatty acids, or water, aqueous solutions, etc., and thereby inactivate the catalyst before any undesirable reversion in interesterification takes place. If the resulting fat is fairly fluid or is in the condition of a slurry, treatment with the acid material is a simple procedure. If, however, after interesterification the fat is solid or substantially so, it may be necessary to reduce it to granular form before treatment with the acid in order to inactivate the catalyst effectively.

Since the temperatures at which the oils used in the practice of the present invention can begin to form solid mixed triglycerides are below 160° F., in most cases below 120° F., the temperature at which the interesterification is conducted in accordance with this invention for most practical applications is below such temperature but sufficiently high that a substantial proportion of the fat is liquid, and sufficiently low to permit the crystallization from the liquid fat of mixed triglycerides of low solubility formed in the interesterification. In some applications of the invention it may be desirable to conduct the reaction at temperatures at which the fat appears to be solid, but actually contains liquid fat entangled in the crystals of precipitated mixed triglycerides. Even under such conditions rearrangement of the fatty acid radicals of the glycerides in the liquid phase will take place to form mixed triglycerides of low solubility. Specifically the process has been successfully operated at final temperatures as low as 32° F., and even lower temperatures may be employed if desired.

Having thus described my invention, what I claim and desire to secure by Letters Patent is:

1. In the process of interesterifying a triglyceride constituted of combined fatty acids whose molecular structures differ in respects affecting solubility of glycerides thereof in the glyceride system, the said process comprising contacting the triglyceride with a low temperature interesterification catalyst at a temperature below 160° F. and sufficiently low to permit progressive crystallization of triglycerides of low solubility as the same are formed during interesterification, the steps which comprise beginning the interesterification in the presence of triglyceride crystals consisting predominantly of mixed triglycerides, and maintaining the temperature of the mixture within a range of which the lower limit is the lowest temperature at which a portion of the triglyceride is liquid and the upper limit is the highest temperature at which mixed triglycerides can crystallize in the liquid as the same are formed during interesterification.

2. The process of claim 1 in which the triglyceride being subjected to interesterification is constituted of combined saturated fatty acids in substantial proportion, and in which the mixed triglyceride crystals present at the beginning of interesterification are constituted of saturated fatty acids of different molecular weight.

3. The process of claim 1 in which the triglyceride being subjected to interesterification is constituted of combined saturated and unsaturated fatty acids and in which the mixed triglyceride crystals present at the beginning of interesterification are mixed saturated-unsaturated triglyceride crystals.

4. The process of claim 1 in which a triglyceride fat constituted of combined saturated and unsaturated fatty acids is subjected to interesterification and in which the mixed triglyceride crystals present at the beginning of interesterification are disaturated-monounsaturated triglyceride crystals.

5. The process of claim 1 in which the crystallized mixed triglyceride present at the beginning of interesterification is incorporated in the triglyceride being subjected to interesterification prior to contact with the catalyst.

6. The process of claim 1 wherein trigryceride fat being subjected to interesterification is first contacted with the catalyst and the resulting mixture is promptly thereafter subjected to a reduction in temperature at such a rate that crystallization of mixed triglycerides originally present is effected and the presence of crystals thereof at the beginning of interesterification is established.

7. The process of claim 1 in which triglyceride fat being subjected to interesterification is cooled to effect crystallization of mixed trigylcerides and the mixture of solid and liquid triglycerides is then contacted with the catalyst.

8. The process of claim 1 in which triglyceride fat being subjected to interesterification is constituted of combined saturated and unsaturated fatty acids and is cooled to effect crystallization of mixed saturated-unsaturated trigylcerides and the mixture of solid and liquid triglycerides is then contacted with the catalyst.

9. A process for preferential interesterification which comprises cooling a triglyceride fat constituted of combined saturated and unsaturated fatty acids and crystallizing mixed triglycerides of saturated and unsaturated fatty acids without solidifying all of the liquid triglycerides, incorporating with the mixture of solid and liquid triglycerides a low temperature interesterification catalyst, maintaining the temperature not substantially higher that the temperature of crystallization, and permitting interesterification with simultaneous crystallization of mixed triglycerides of saturated and unsaturated fatty acids.

10. The process of claim 9, in which the triglyceride fat is a partially hydrogenated fat.

11. The process of claim 9, in which the triglyceride fat is cottonseed oil hydrogenated to 75 to 80 iodine value.

12. The process of claim 9, in which the triglyceride fat is soybean oil hydrogenated to 75 to 80 iodine value.

13. A preferentially arranged triglyceride fatty product formed by molecular rearrangement wholly from an original triglyceride fatty material containing glyceryl radicals in combination with fatty acid radicals of more than one kind whose molecular structures differ one from another in respects affecting the solubility of glycerides thereof in the glyceride system, in which product said fatty acid radicals are preferentially disposed to form higher melting mixed triglycerides by the process of claim 1, the said mixed triglycerides being primarily in a solid phase at the end of the rearrangement, and the mixture of triglycerides of said product existing in liquid phase at the end of said rearrangement having combined fatty acids thereof in substantially random arrangement characteristic of rearrangement wholly in the liquid phase, the said product containing a substantially greater quantity of said higher melting mixed glycerides than the said original material and than could exist under conditions of ester interchange wholly in a liquid phase of the whole original material, and having a characteristic of changing from solid condition to liquid condition over a narrower range of temperatures than the original material.

14. The product of claim 13 in which the original triglyceride material is constituted of major proportions of combined saturated and unsaturated fatty acids, and in which said mixed triglycerides are mixed saturated-unsaturated triglycerides.

EDDY W. ECKEY.